(12) United States Patent
Gutenmann

(10) Patent No.: US 7,851,096 B2
(45) Date of Patent: Dec. 14, 2010

(54) HUMIDIFYING A REACTANT FLOW OF A FUEL CELL SYSTEM

(75) Inventor: David A. Gutenmann, Clifton Park, NY (US)

(73) Assignee: Plug Power Inc., Latham, NY (US)

( * ) Notice: Subject to any disclaimer, the term of this patent is extended or adjusted under 35 U.S.C. 154(b) by 1346 days.

(21) Appl. No.: 11/319,042

(22) Filed: Dec. 27, 2005

(65) Prior Publication Data

US 2007/0148505 A1 Jun. 28, 2007

(51) Int. Cl.
*H01M 8/04* (2006.01)
*H01M 8/06* (2006.01)

(52) U.S. Cl. .................. 429/413; 429/428; 429/430; 429/434

(58) Field of Classification Search ............... None
See application file for complete search history.

(56) References Cited

U.S. PATENT DOCUMENTS

| | | | |
|---|---|---|---|
| 5,773,160 A | 6/1998 | Voss et al. | |
| 6,376,111 B1 | 4/2002 | Mathias et al. | |
| 6,497,970 B1 | 12/2002 | Fronk | |
| 6,524,733 B1 | 2/2003 | Nonobe | |
| 6,562,501 B1 * | 5/2003 | Nagamiya et al. | 429/25 |
| 6,696,192 B2 * | 2/2004 | Kanai et al. | 429/34 |
| 6,706,429 B1 | 3/2004 | Frank et al. | |
| 6,746,789 B1 | 6/2004 | Chen et al. | |
| 6,783,878 B2 | 8/2004 | Voss et al. | |
| 6,821,660 B2 | 11/2004 | Andrews et al. | |
| 6,869,709 B2 | 3/2005 | Shimotori et al. | |
| 2003/0104261 A1 | 6/2003 | Schnitzer et al. | |
| 2003/0162065 A1 * | 8/2003 | Miyauchi et al. | 429/26 |
| 2008/0014475 A1 | 1/2008 | LeBoe et al. | |

OTHER PUBLICATIONS

Notice of Allowance in U.S. Appl. No. 11/823,552 entitled, "Anode Humidification," filed on Jun. 28, 2007.

* cited by examiner

*Primary Examiner*—John S Maples
(74) *Attorney, Agent, or Firm*—Trop, Pruner & Hu, P.C.

(57) ABSTRACT

A technique that is usable with a fuel cell includes generating a humidified reactant flow. The technique includes measuring a rate of condensate production from the reactant flow and controlling the generation of the humidified reactant flow in response to the measured rate of condensate production.

8 Claims, 6 Drawing Sheets

HUMIDIFYING A REACTANT FLOW OF A FUEL CELL SYSTEM

BACKGROUND

The invention generally relates to humidifying a reactant flow of a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

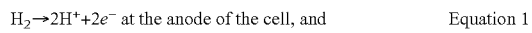

$$H_2 \rightarrow 2H^+ + 2e^- \text{ at the anode of the cell, and} \qquad \text{Equation 1}$$

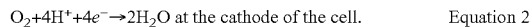

$$O_2 + 4H^+ + 4e^- \rightarrow 2H_2O \text{ at the cathode of the cell.} \qquad \text{Equation 2}$$

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack is one out of many components of a typical fuel cell system, as the fuel cell system includes various other components and subsystems, such as a cooling subsystem, a cell voltage monitoring subsystem, a control subsystem, a power conditioning subsystem, etc. The particular design of each of these subsystems is a function of the application that the fuel cell system serves.

The fuel cell system may include a humidification subsystem that introduces water vapor into one or both (anode and cathode) reactant streams, or flows, that enter the fuel cell stack. More specifically, low temperature fuel cell systems, such as PEM-type systems, need reactants that are fully saturated with water vapor. The full saturation is needed to avoid drying out the fuel cells for purposes of maximizing membrane life.

Although full saturation is needed, supersaturating the reactant flow may have adverse effects. For example, a supersaturated reactant flow may flood inlets of the fuel cells. Because fuel typically is consumed for purposes of humidifying the anode reactant flow, supersaturating the anode reactant flow may also reduce the electrical efficiency of the fuel cell system.

Thus, it is typically desirable to monitor the humidification level of the reactant flow. Although a water vapor measurement probe could conceivably be used to measure the humidity level, the use of such a probe may produce insufficient results, in that the accuracy of the water vapor measurement probe in flow streams is yet unproven.

Thus, there exists a continuing need for better ways to monitor and regulate the humidification level of a reactant flow of a fuel cell system.

SUMMARY

In an embodiment of the invention, a method that is usable with a fuel cell includes generating a humidified reactant flow; measuring a rate of condensate production from the reactant flow; and controlling the generation of the humidified reactant flow in response to the measured rate of condensate production.

Advantages and other features of the invention will become apparent from the following drawing, description and claims.

DETAILED DESCRIPTION

In accordance with an embodiment of the invention, the rate at which condensate is produced from a humidified reactant flow of a fuel cell system is used as an indication of a humidity level of the reactant flow. Therefore, by measuring the rate at which condensate is produced from the humidified reactant flow, the humidity level of the reactant flow may be controlled in a feedback loop to both conserve fuel consumption in the fuel cell system and maximize the electrical efficiency of the system.

Figure 1:
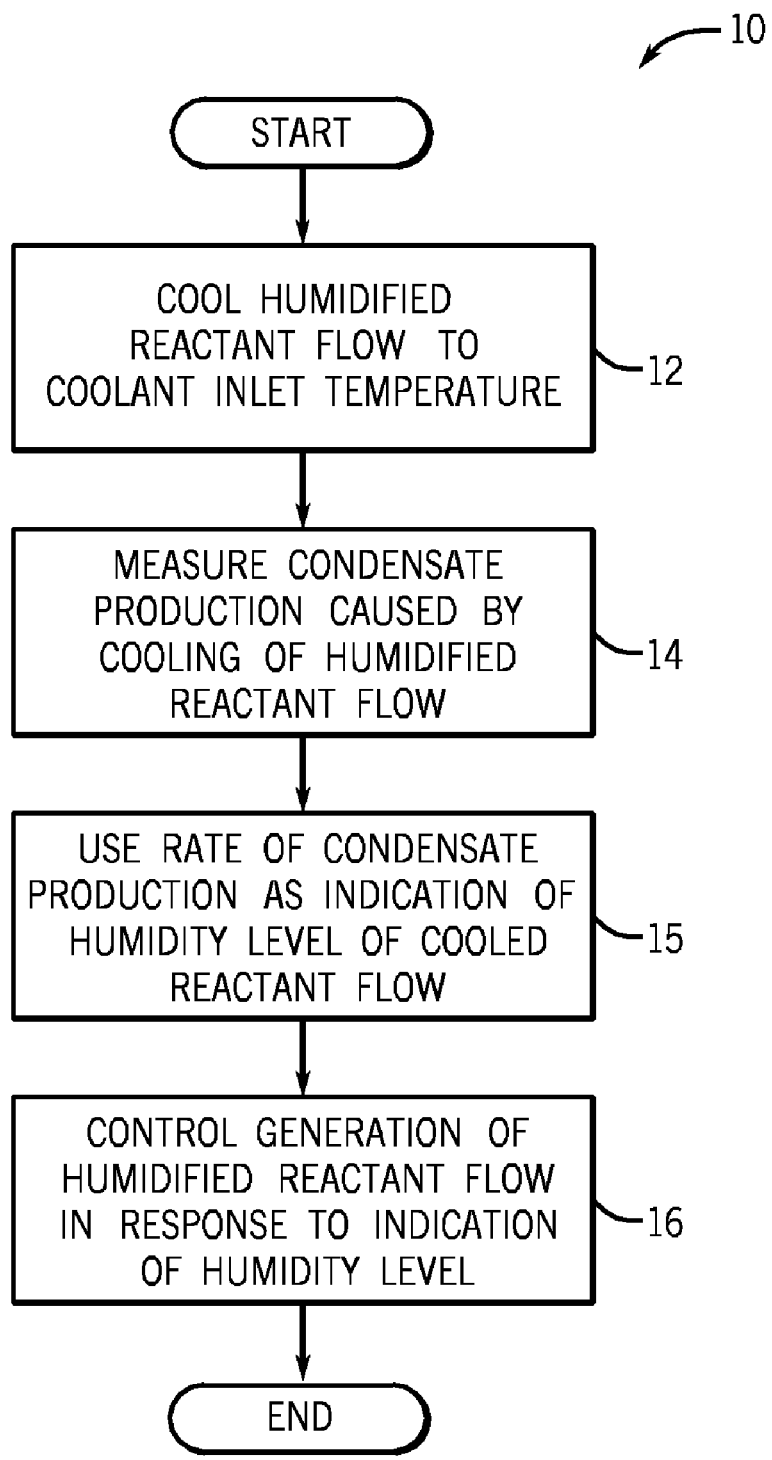
FIG. 1 is a flow diagram depicting a technique to regulate the humidity level of a humidified reactant flow of a fuel cell system according to an embodiment of the invention.

Referring to FIG. 1, more specifically, in accordance with an embodiment of the invention, a technique 10 to regulate the humidity level of a reactant flow includes cooling (block 12) a humidified reactant flow to the temperature of a coolant that is used to cool a fuel cell stack of the fuel cell system (i.e., a coolant that flows through the coolant channels of the fuel cell stack). More specifically, in accordance with some embodiments of the invention, this cooling includes cooling the humidified reactant flow to the temperature of the coolant at the coolant inlet port of the fuel cell stack. The cooling of the humidified reactant stream cleaves the reactant dew point of the reactant flow to the coolant inlet temperature and condenses the excess vapor to liquid water (herein referred to as "condensate").

The embodiments of the invention, which are described herein recognize that the rate at which condensate is produced from the cooling of the reactant flow provides an indication of the level of supersaturation of the reactant flow. Therefore, in accordance with some embodiments of the invention, the rate of condensate production is measured (block 14) and then used (block 15) as an indication of the humidity level of the cooled humidified reactant flow. Therefore, the generation of the humidified reactant flow may be controlled (block 16) in response to this indication of the humidity level.

Figure 2:
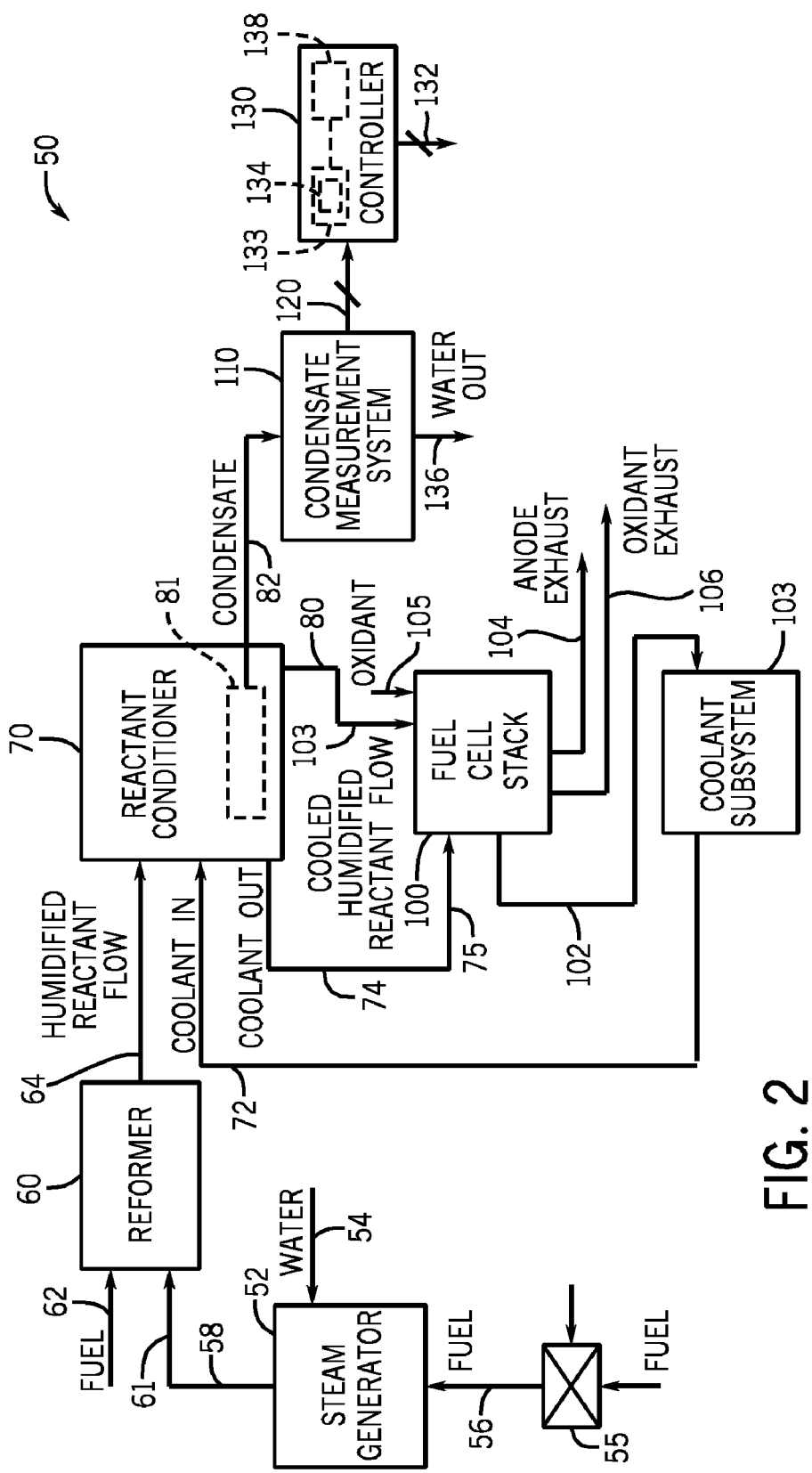
FIG. 2 is a schematic diagram of a fuel cell system according to an embodiment of the invention.

As a more specific example, FIG. 2 depicts a fuel cell system 50 in accordance with an embodiment of the invention. For purposes of producing a humidified reactant flow, the system 50 includes a steam generator 52 that has a water inlet 54 that receives water that is converted by the generator 52 into steam. The steam generator 52 also includes a fuel inlet 56 that receives a hydrocarbon for purposes of introducing water vapor from the steam into the received hydrocarbon flow.

The humidified hydrocarbon flow passes from an outlet 58 of the steam generator 52 into an inlet 61 of a reformer 60. The reformer 60 also includes a fuel inlet 62 that receives an additional, non-humidified hydrocarbon flow, in some embodiments of the invention. In other embodiments of the invention, the fuel inlet 62 may receive anode exhaust gas from a fuel cell stack 100 of the fuel cell system 50. Thus, many variations are possible and are within the scope of the appended claims.

The reformer 60 produces a humidified reactant flow that is routed to an inlet 64 of a reactant conditioner 70. As its name implies, the reactant conditioner 70 conditions the humidified reactant flow by serving as a heat exchanger to cleave the reactant dew point to the coolant inlet temperature. In some embodiments of the invention, the reactant conditioner 70 may be a co-flow heat exchanger.

Inside the reactant conditioner 70, the stack coolant inlet temperature dominates when the stack coolant is a liquid and the reactant flow is a gas. Thus, the reactant conditioner 70 cleaves the reactant flow into two streams: a cooled and humidified reactant flow that exits the reactant conditioner 70 (via an outlet port 80) and enters the anode chamber of the fuel cell stack 100; and a stream of liquid water, or condensate, that represents the supersaturated portion of the water vapor.

The condensate collects in a reservoir 81 of the reactant conditioner and drains out of the reservoir 81 through a condensate outlet port 82. Alternatively, in some embodiments of the invention, the reactant conditioner 70 may not contain the reservoir 81. As depicted in FIG. 2, the reactant conditioner 70 includes a coolant inlet port 72 and a coolant outlet port 74 for purposes of circulating the coolant through the reactant conditioner 70. The coolant outlet port 74 may be in communication with a coolant inlet port 75 of the fuel cell stack 100, in some embodiments of the invention.

As noted above, the rate at which the reactant conditioner 70 produces condensate is an indication of the humidity level of the cooled humidified reactant flow that exits the conditioner 70 (via the outlet port 80). In accordance with some embodiments of the invention, the accumulated condensate is directed from the reservoir 81, through the condensate outlet port 82 and into a condensate measurement system 110.

The condensate measurement system 110 determines the rate at which condensate is being produced. The condensate measurement system 110 communicates (via electrical communication lines 120 and 132) with a controller 130 of the fuel cell system 50 for purposes of controlling measurement and determination of the rate of condensate production, as further described below. Based on the determined rate, the controller 130 regulates the amount of fuel that is consumed for purposes of humidifying the reactant flow. More specifically, in accordance with some embodiments of the invention, the controller 130, in response to the determined rate of condensate production, controls the rate at which fuel is provided to the steam generator 52. This control may be through the form of a valve 55 (for example) that controls the flow of fuel into the fuel inlet port 56 of the steam generator 52.

As further described below, in some embodiments of the invention, the controller 130 may be coupled to include one or more input lines (such as lines 120) for purposes of directing the measurement of the condensate production rate by the condensate measurement system 110, receiving system status signals, etc. Furthermore, the controller 130 may be coupled to one or more electrical control lines, such as lines 132, for purposes of closing switches, controlling valves, etc., to the control of the humidification of the reactant stream, control the condensate production rate measurement, etc., depending on the particular embodiment of the invention. Additionally, the controller 130 may be electrically coupled to the valve 55 to control the amount of fuel that is consumed for humidification of the reactant flow (and thus, control the humidification of the reactant flow) in response to a determined rate of condensate production.

The controller 130 may include a processor 138 (representing one or more microprocessors or microcontrollers, for example). The processor 138 may be coupled to a memory 133 of the controller 130. The memory 133 may store program instructions 134 for purposes of causing the processor 138 to perform one or more of the techniques that are disclosed herein. Thus, for example, in some embodiments of the invention, the processor 138 may execute program instructions 134 to perform the technique that is depicted in FIG. 1. Other and different techniques may be performed by the controller 130, in other embodiments of the invention. Furthermore, the controller 130 may control other aspects and subsystems of the fuel cell system 50, depending on the particular embodiment of the invention.

Among the other features of the fuel cell system 50, in some embodiments of the invention, the fuel cell system 50 includes a coolant subsystem 103 that circulates coolant through the reactant conditioner 70 and through the fuel cell stack 100. More specifically, in some embodiments of the invention, the coolant subsystem 103 may pump coolant into the coolant inlet port 72 of the reactant conditioner 70. This coolant exits the coolant outlet port 74 of the reactant conditioner 70 and enters the coolant inlet port 75 of the fuel cell stack 100. The coolant circulates through the fuel cell stack 100 and exits the stack 100 through a coolant outlet port 102 of the stack 100. The coolant then returns to the coolant subsystem 103 that may contain, for example, one or more heat exchangers for purposes of removing thermal energy absorbed by the coolant from the fuel cell stack 100. After removal of this thermal energy, the coolant subsystem 103 circulates the coolant back into the coolant inlet port 72 of the reactant conditioner 70.

As depicted in FIG. 2, in some embodiments of the invention, the fuel cell stack 100 may include an anode inlet port 108 that receives the cooled humidified reactant flow from the outlet port 80 of the reactant conditioner 70. Furthermore, the fuel cell stack 100 may include a cathode inlet port 105 that receives an oxidant flow into the fuel cell stack 100. The fuel cell stack 100 may also include exhaust ports, such as an oxidant exhaust port 106 and an anode, exhaust port 104. It is noted that in some embodiments of the invention, the exhaust flows from the fuel cell stack 100 may be directed to oxidizers, or flairs or other devices, depending on the particular embodiment of the invention.

Although FIG. 2 depicts the anode flow to the fuel cell stack as being humidified, it is noted that in other embodiments of the invention, the oxidant flow to the fuel cell stack 100 may be humidified and thus, the techniques that are described herein may likewise be applied to humidifying an oxidant flow. Furthermore, in some embodiments of the invention, both anode and oxidant flows may be humidified in accordance with the techniques disclosed herein. Thus, many variations are possible and are within the scope of the appended claims.

Figure 3:
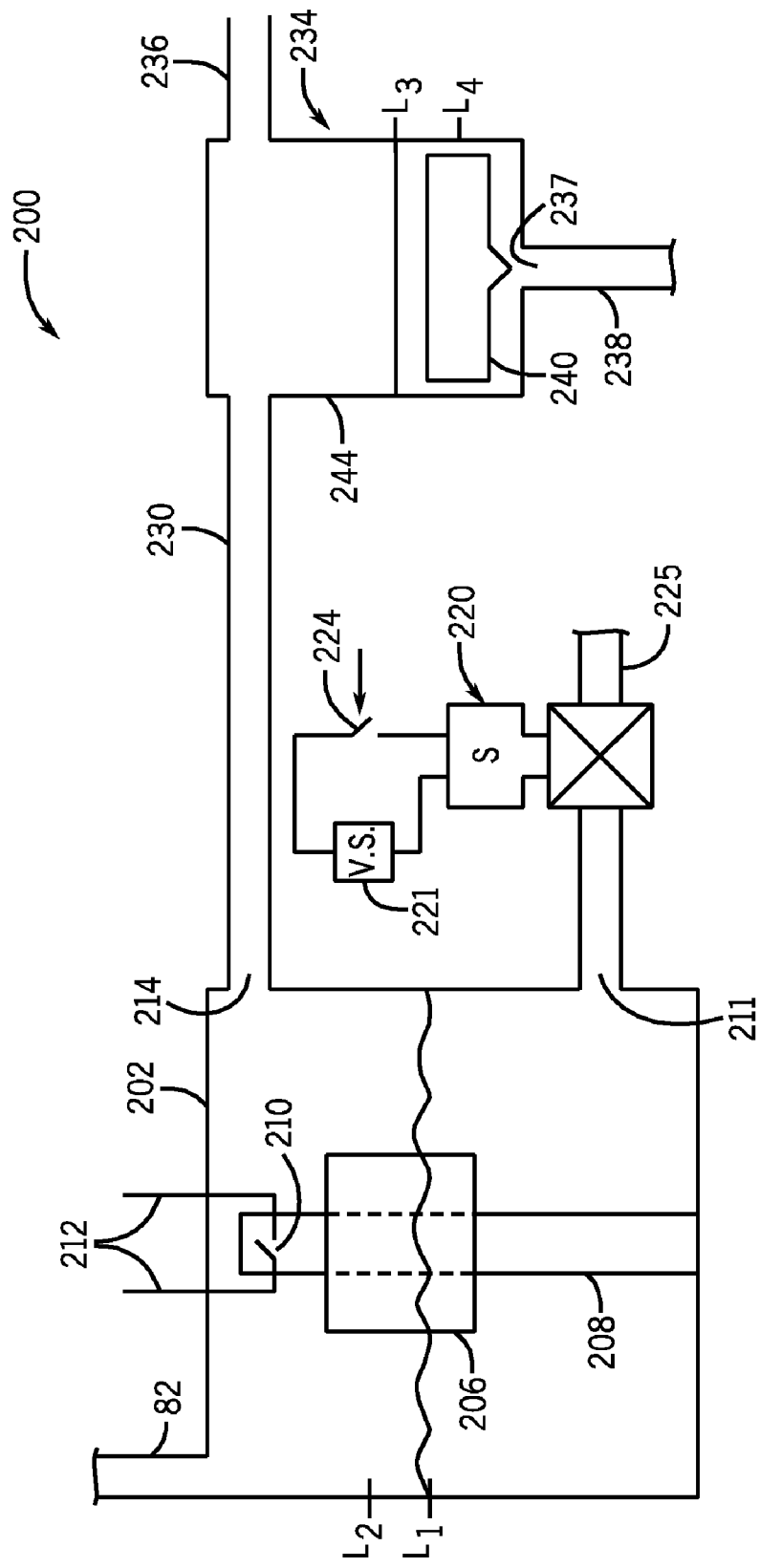
FIGS. 3, 4 and 5 are schematic diagrams of condensate measurement systems according to different embodiments of the invention.

Referring to FIG. 3, a condensate measurement system 200 (a more specific embodiment of the condensate measurement system 110 of FIG. 2) may be used in some embodiments of the invention. The system 200 includes a water tank 202 that is constructed to store water that is received from the condensate outlet port 82 of the reactant conditioner 70 (see FIG. 2). Thus, condensate that enters the tank 202 from the outlet port 82 accumulates in the tank 202 to produce a particular level (such as the level $L_1$ that is depicted in FIG. 3) of condensate in the tank 202.

The condensate measurement system 200 measures of the rate of condensate production by measuring the rate at which condensate fills the tank 202. More specifically, in accordance with some embodiments of the invention, condensate collects in the tank 202 until the condensate reaches a predetermined upper water level $L_2$. Upon reaching this level, the tank 202 empties. Because the tank 202 releases a constant volume of water when emptied, the rate of condensate production may be determined by observing the number of times the tank 202 empties over a particular fixed interval of time.

The controller 130 (see FIG. 2) compares the observed rate to upper and lower rate thresholds to determine if the humidification level of the reactant stream is within a desired range. If the observed rate is above the upper rate threshold, then excessive supersaturation has occurred, and the fuel consumed in the humidification of the reactant flow is reduced. Conversely, if the rate is below the lower rate threshold, then additional humidification of the reactant flow is needed, and additional fuel is consumed to produce a higher humidification level.

As a more specific example, if the fuel cell system 50 (FIG. 2) is operating at relatively high power, then condensate production may be 2 millimeters (ml) per minute (as an example) if the reactant conditioner 70 is supersaturating the reactant flow by 1.0° Celsius (C). If the tank 202 discharges 1 ml each time it empties, then the tank 202 would be expected to empty two times per minute. If the tank 202 empties more often, then the fuel that is consumed for purposes of humidification is reduced. If the tank 202 empties significantly less often than two times per minute then more fuel may need to be consumed to produce a greater water saturation level in the reactant flow.

Continuing the example above, if the fuel cell system is operating at a lower power level, then less condensate production would be expected at full saturation. For example, for lower power operation, 0.2 ml/minute of condensate production may be expected for 1.0° C. supersaturation. Given that the tank 202 empties 1 ml (in this example) each time, if the tank 202 empties more than once every five minutes, then the fuel that is consumed for purposes of humidification is reduced. If the tank 202 empties significantly less often than once every five minutes then more fuel may need to be consumed to produce a greater water saturation level in the reactant flow. Therefore, as can be appreciated, the expected range of rates of condensate production for proper humidification depends on the operating power level of the fuel cell system.

Regarding the more specific details of the condensate measurement system 200, in some embodiments of the invention, a float 206 may be located inside the tank 202. The float 206 rises and falls with the level of condensate, as the float 206 travels on a guide 208 that is orthogonal to the water level and extends upwardly from the bottom of the tank 202. Thus, as depicted in FIG. 3, the float 206 rises upwardly as the water level increases from the water level $L_1$ to the level $L_2$.

When the water level reaches the level $L_2$, the float 206, in some embodiments of the invention, closes a switch 210 that is located near the top of the tank 202 (located on the guide 208, for example). The closure of the switch 210, in turn, indicates that the tank 202 is full of condensate. Therefore, upon this occurrence, the tank 202 is emptied.

More particularly, in some embodiments of the invention, electrical communication lines 212 are coupled between the switch 210 and the controller 130 (see FIG. 2). In response to the controller 130 detecting that the switch 210 closes, the controller 130 activates a normally-closed solenoid valve 220 to open the valve 220 to drain the tank 202.

As depicted in FIG. 3, the solenoid valve 220 controls when the tank 202 drains, as the flow control element of the valve 220 controls the flowpath between a drain outlet 211 of the tank 202 and a drain outlet line 225. When in its normally-closed state (i.e., when not activated by the controller 130), the solenoid valve 220 prevents draining of the tank 202. However, when the tank 202 becomes full, as indicated by closing of the switch 210, the controller 130 controls the solenoid valve 220 to open to permit communication between the drain outlet 211 and the drain outlet line 225 and thus, drain of the tank 202.

As depicted in FIG. 3, in a particular embodiment of the invention, the controller 130 (FIG. 2) may control operation of an electrical switch 224 (a relay switch, for example) that controls communication between a voltage source 221 and the terminals of a control winding of the solenoid valve 220. Other arrangements and techniques to control the solenoid valve 220 are possible in other embodiments of the invention. Furthermore, a valve other than a solenoid valve may be used in other embodiments of the invention.

Therefore, due to the arrangement that is depicted in FIG. 3, if measurement of the condensate production rate is desired, the controller 130 (FIG. 2) initially opens the solenoid valve 220 to drain the tank 202 of any condensate contained therein. This action places the tank 202 in a known state. The controller 130 then measures a fixed interval of time and monitors the rate, or frequency, at which the tank 202 empties during this time. Thus, after the initial emptying of the tank 202, each time that the switch 210 closes, the controller 130 operates the solenoid valve 220 to drain the tank 202 and increments the number of observed drainings (initially at zero at the beginning of the fixed time interval) of the tank 202. At the end of the fixed time interval, the controller 130 determines the frequency that the tank 202 emptied by dividing the number of times that the tank 202 emptied by the duration of the fixed time interval. Because the tank 202 empties a fixed amount of condensate, this frequency directly indicates the rate of condensate production.

The fuel cell system 50 (FIG. 2) may not continually measure the rate of condensate production, in some embodiments of the invention. Therefore, during some intervals of time, the controller 130 may not control the solenoid valve 220 to empty the tank 202 when the tank 202 is full. If the condensate measurement system 200 is not being used during one of these intervals of time, condensate may be allowed to overflow from the tank 202. Thus, in some embodiments of the invention, the tank 202 includes an overflow outlet port 214 that is located near the top of the tank 202. As shown in FIG. 3, in some embodiments of the invention, the overflow port 214 may be located at a position above the water level $L_2$.

Condensate that reaches the overflow port 214 flows through the overflow port 214, through an overflow conduit 230 and into a gas/water separator 234, in some embodiments of the invention. The gas/water separator 234, in turn, ensures that a water seal is formed between a water return line 238 (that returns liquid water to the steam generator 52 or coolant subsystem 103, for example) and any gas that enters the separator 234. The gas/water separator 234 includes an outlet port 236 for purposes of communicating gas back to a flair or oxidizer (as examples) of the fuel cell system 50 (see FIG. 2).

As depicted in FIG. 3, in some embodiments of the invention, the gas/water separator 234 may include a passive float 240 that is located inside a sealed container 244 of the separator 234. The float 240 controls communication of water through a drain outlet port 237 of the gas/water separator 234. More specifically, in some embodiments of the invention, the float 240 is designed so that as long as the water level stays above a certain water level $L_4$, the float 240 remains positioned at the bottom of the container 244 to seal off the drain outlet port 237. Thus, the gas/water separator 234 is designed to have a minimum level of water for purposes of forming a water seal between the water and gas inside the separator 234. However, when the water rises above the level $L_4$, such as the level $L_3$ (as an example), the float 240 rises, as depicted in FIG. 3. For this scenario, the rising of the float 240 permits water to drain from the water separator 234 (through the drain outlet port 237) until the water reaches the $L_4$ level, a level that causes the float 240 to sink to the bottom of the container 244 and seal off the drain outlet port 237.

Figure 4:
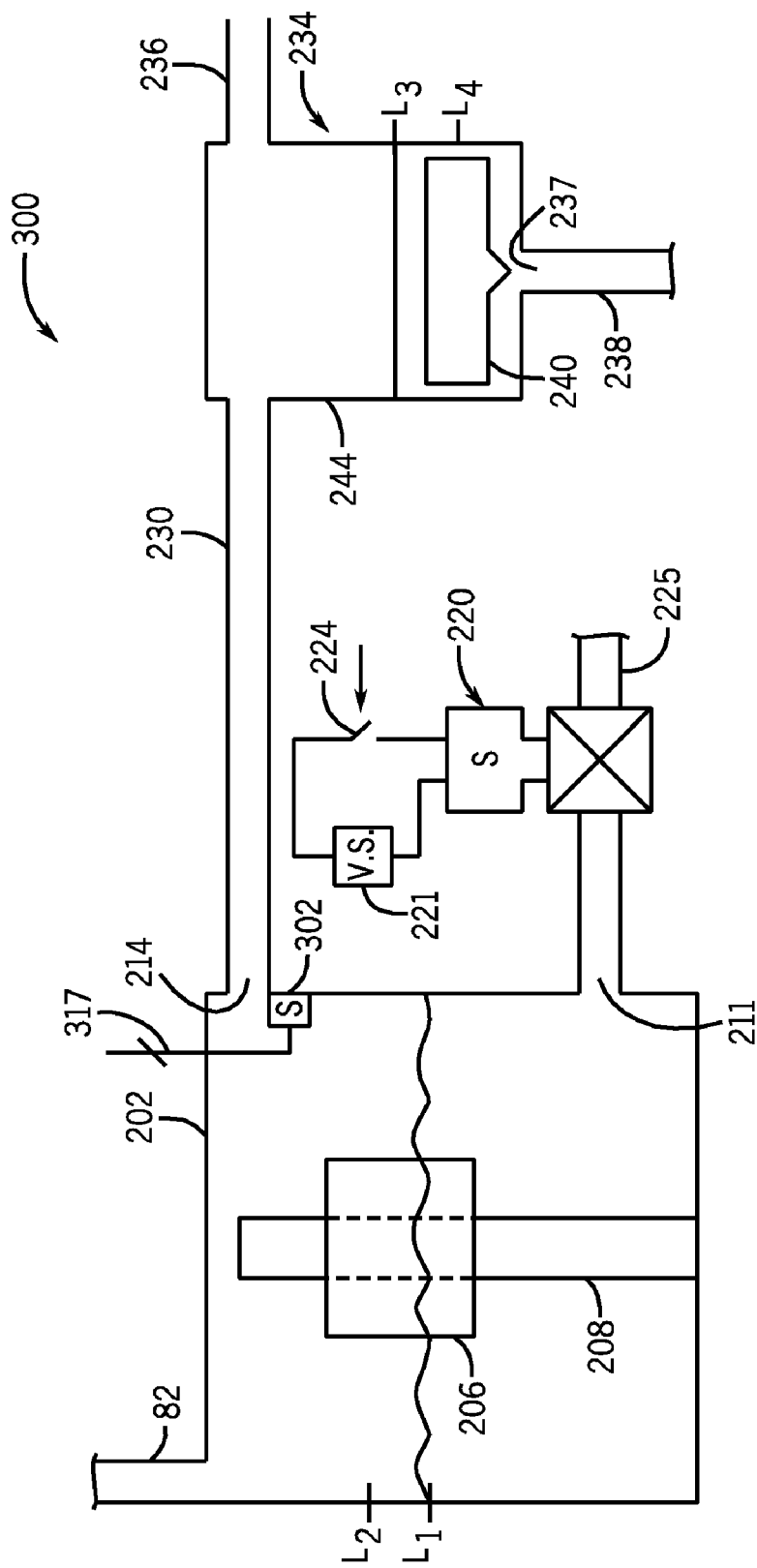

Referring to FIG. 4, in some embodiments of the invention, the condensate measurement system 200 may be replaced by an alternative condensate measurement system 300. The condensate measurement system 300 is similar to the system 200, with like reference numerals pointing to elements shared in common. The differences between the condensate measurement systems 200 and 300 include a sensor 302 (of the condensate measurement system 300) that is used to measure the condensate level and provide a signal when the level of the water inside the tank 202 reaches the sensor 302. The sensor 302 may be a water level electrode, for example.

The advantage of using the sensor 302 (instead of the switch 212 (FIG. 3), for example) is that there are fewer dimensional constraints and therefore, a smaller discrete volume of water may be measured inside the tank 202. However, the float 206 needs to be large enough to be buoyant, and the tank 202 needs to be large enough to avoid interference with the float 206, even in the presence of contaminants.

When the water inside the tank 202 rises to the sensor 302, one or more electrical communication lines 317 from the sensor 302 signal the controller 130 (see FIG. 2) and indicate the full tank state. Upon detecting this occurrence, the controller 130 activates the solenoid valve 220 to drain the tank 202.

Many other arrangements may be used to measure the rate at which condensate is produced. For example, in other embodiments of the invention, a mechanical counter may be used to count the number of times that the solenoid valve 220 operates to empty the tank 202. In these embodiments of the invention, for example, the mechanical counter may be reset at the beginning of the measurement period, and then, at the conclusion of the measurement period, the count indicated by the counter may be used to ascertain the rate, or frequency, at which the condensate is being produced.

Figure 5:
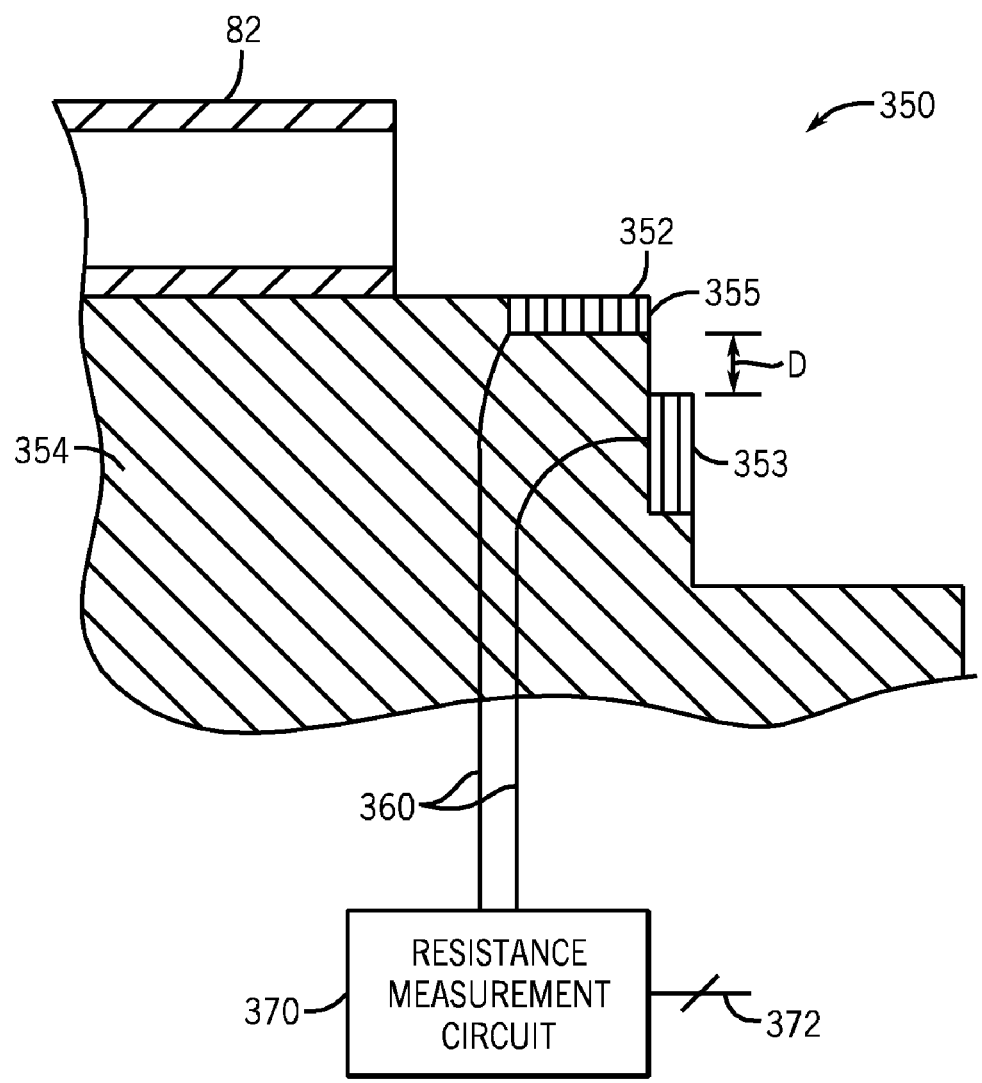

As an example of yet another embodiment of the invention, a condensate measurement system 350 that is depicted in FIG. 5 may be used. Unlike the condensate measurement systems 200 and 300, the condensate measurement system 350 does not include a tank and a float. Instead, the condensate measurement system 350 measures the drip rate of condensate from the condensate outlet port 82. As a more specific example, in some embodiments of the invention, the condensate measurement system 350 may include two electrodes 352 and 353.

The electrodes 352 and 353 are mounted to a dielectric body 354 (of the condensate measurement system 350) and are arranged so that the electrode 352 is located on a drip edge 355 of the body 354. The electrode 352 is spaced by a distance D from the electrode 353. Thus, the electrode 352 forms the drip edge 355, and the other electrode 353 is spaced by a distance D downstream of the drip edge.

Due to the spacing D, a full drop of water bridges the distance D between the electrodes 352 and 353 and decreases the resistance between the electrodes 352 and 353. A resistance measurement circuit 370 that is coupled to the electrodes 352 and 353 (via electrical communication lines 360) detects the decrease in resistance due to the bridging drop of water.

The resistance measurement circuit 370 normally (in the absence of water bridging between the electrodes 352 and 353) senses an open circuit in that an air gap exists between the electrodes 352 and 353. However, the bridging drop of water causes the resistance measurement circuit 370 to signal the controller 130 (see FIG. 2) so that the controller 130 may maintain a count of the number of drips over a fixed interval of time. By dividing the number of observed drips by the duration of the fixed interval of time, the controller 130 may then determine a drip rate.

The drip rate, in turn, indicates the rate of condensate production. In this regard, when the reactant flow is sub-saturated, a relatively low frequency drip rate is observed by the controller 130. Therefore, in response to the drip rate decreasing below a certain low drip rate threshold, the controller 130 increases the fuel that is consumed for humidification. At the saturation point, there is a relatively higher frequency of drips. However, at supersaturated conditions, there is a continual closed circuit connection, as a steady stream of water flows between the electrodes 352 and 353. Thus, when a continuous stream is detected (i.e., in response to the resistivity measurement circuit 370 detecting and indicating continuous bridging of the electrodes 352 and 353), the controller 130 decreases the amount of fuel used for humidification until the drip rate falls into the desired range.

Figure 6:
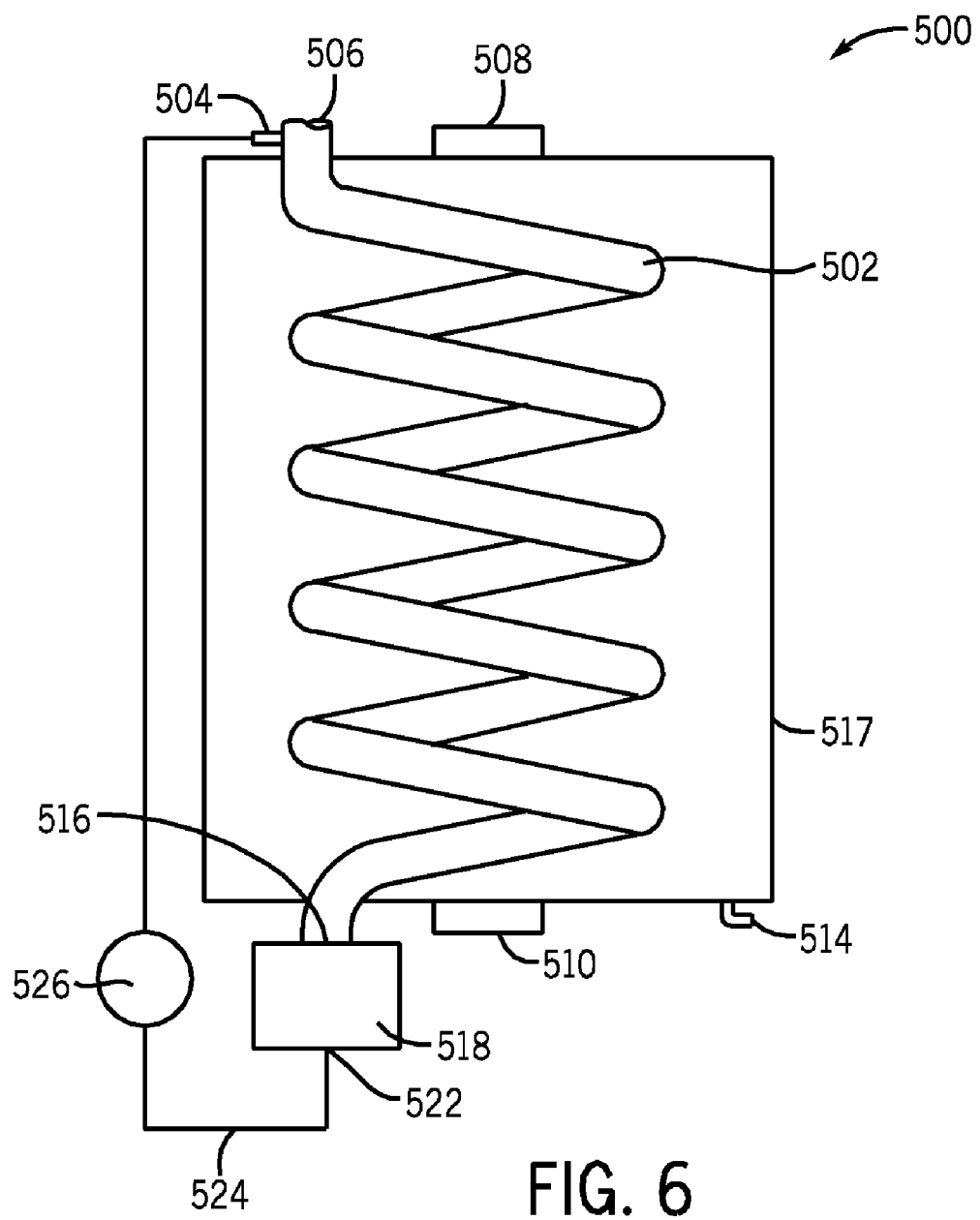
FIG. 6 is a schematic diagram of a reactant conditioner according to an embodiment of the invention.

The reactant conditioner 70 (FIG. 2) may be one of many different types of reactant conditioners, depending on the particular embodiment of the invention. FIG. 6 depicts a reactant conditioner 500 in accordance with some embodiments of the invention for purposes of example.

The reactant conditioner 500 includes a chamber 517 that houses a helical coil 502. The humidified reactant flow from the reformer 60 (see FIG. 2) is communicated through the chamber 517 and across the outer surface of the helical coil 502. The helical coil 502, in turn, includes an inlet port 506 to receive an incoming flow of coolant. The coil 502 also includes an outlet port 516 to deliver coolant from the reactant conditioner 500. The chamber 517 is sealed to communicate the humidified reactant flow from an inlet port 508 (of the chamber 517) to an outlet port 510 (of the chamber 517). Thus, in some embodiments of the invention, both the coolant and the humidified reactant flows flow in the same direction, thereby forming a co-flow heat exchanger.

The coolant may be pumped through the coil 502 via a pump 526; and the humidified reactant flow may be directed through the ports 508 and 510 by an associated pump (not shown), depending on the particular embodiment of the invention. Due to the relatively warmer humidified reactant flow passing over the coil 502, condensate is formed which falls to the bottom of the chamber 517. As depicted in FIG. 6, the condensate drains from the reactant conditioner 500 via a drain outlet port 514. In the embodiment that is depicted in FIG. 2, the drain outlet port 514 forms the condensate outlet port 80.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell, comprising:
   generating a humidified reactant flow, comprising:
   introducing water vapor into a first fuel flow;
   mixing the first fuel flow with a second fuel flow; and
   reforming the mixed first and second fuel flows;
   measuring a rate of condensate production from the reactant flow; and
   controlling the generation of the humidified reactant flow in response to the measured rate of condensate production.

2. The method of claim 1, further comprising:
   using the measured rate of condensate production as an indication of a humidity level of the humidified reactant flow.

3. The method of claim 1, further comprising:
   determining a degree of supersaturation of the humidified reactant flow in response to the measured rate condensate production.

4. The method of claim 1, wherein the measuring comprises:
   routing the condensate into a container; and
   determining a frequency at which the condensate fills up the container.

5. The method of claim 1, wherein the measuring comprises:
   determining a drip rate of the condensate.

6. The method of claim 1, wherein the measuring comprises:
   triggering a counter to measure the condensate production.

7. The method of claim 1, wherein the controlling comprises:
   controlling the first fuel flow in response to the measured rate of condensate production.

8. A method usable with a fuel cell, comprising:
   generating a humidified reactant flow;
   measuring a rate of condensate production from the reactant flow;
   controlling the generation of the humidified reactant flow in response to the measured rate of condensate production; and
   cooling the humidified reactant flow to a lower temperature, comprising cooling the humidified reactant flow to a temperature of a coolant near a coolant inlet of the fuel cell.

* * * * *